United States Patent
Carmichael

(10) Patent No.: US 9,345,359 B2
(45) Date of Patent: May 24, 2016

(54) COFFEE BREWING DEVICE WITH MANUAL SIPHON AND METHOD OF BREWING WITH SAME

(71) Applicant: La Colombe Torrefaction, Inc., Philadelphia, PA (US)

(72) Inventor: Todd Carmichael, Gladwyne, PA (US)

(73) Assignee: La Colombe Torrefaction, Inc., Philadelphia, PA (US)

( * ) Notice: Subject to any disclaimer, the term of this patent is extended or adjusted under 35 U.S.C. 154(b) by 0 days.

(21) Appl. No.: 14/330,763

(22) Filed: Jul. 14, 2014

(65) Prior Publication Data
US 2016/0007794 A1    Jan. 14, 2016

(51) Int. Cl.
| | |
|---|---|
| *A47J 31/38* | (2006.01) |
| *A47J 31/44* | (2006.01) |
| *A23F 5/26* | (2006.01) |
| *A47J 31/10* | (2006.01) |
| *A47J 31/18* | (2006.01) |
| *A47J 31/043* | (2006.01) |

(52) U.S. Cl.
CPC .............. *A47J 31/38* (2013.01); *A23F 5/262* (2013.01); *A47J 31/043* (2013.01); *A47J 31/10* (2013.01); *A47J 31/18* (2013.01); *A47J 31/4403* (2013.01)

(58) Field of Classification Search
CPC ....... A47J 31/38; A47J 31/43; A47J 31/4403; A47J 31/10; A47J 31/18; A23F 5/262
See application file for complete search history.

(56) References Cited

U.S. PATENT DOCUMENTS

| | | | |
|---|---|---|---|
| 1,917,071 A | | 7/1933 | Smith |
| 1,920,121 A | | 7/1933 | Baughman |
| 1,947,687 A | | 2/1934 | Weast |
| 2,123,327 A | | 7/1938 | Biberthaler et al. |
| 2,180,655 A | | 11/1939 | Abbate |
| 2,275,746 A | * | 3/1942 | Edwards ............... A47J 31/043 210/136 |
| 2,359,405 A | * | 10/1944 | Cory ..................... A47J 31/043 285/328 |
| 2,567,187 A | * | 9/1951 | Davis, Jr. .............. A47J 31/047 219/519 |

(Continued)

FOREIGN PATENT DOCUMENTS

| | | |
|---|---|---|
| EP | 1863354 | 6/2013 |
| EP | 2666363 | 11/2013 |

(Continued)

OTHER PUBLICATIONS

English Translation of FR 1535068 published Aug. 1968.*

(Continued)

*Primary Examiner* — Anthony Weier
(74) *Attorney, Agent, or Firm* — Stradley Ronon Stevens & Young, LLP

(57) ABSTRACT

A device for brewing coffee including a jacketed brewing vessel and a manual siphon element and methods of using the device to brew coffee. The device includes a base having a bowl, a first neck communicatively connected to the bowl, and a second neck communicatively connected to the bowl; a brewing vessel communicatively connected to the first neck; and a siphon element communicatively connected to the second neck. Operating the siphon element results in a reduced pressure within the bowl. When the brewing vessel is full of a first volume of water, the reduced pressure within the bowl results in the volume of water flowing from the brewing vessel into the bowl. A second volume of water may be added to a jacket of the brewing vessel to change the temperature of the first volume of water.

20 Claims, 10 Drawing Sheets

(56) References Cited

U.S. PATENT DOCUMENTS

| | | | | |
|---|---|---|---|---|
| 2,606,490 | A | * 8/1952 | Columbus | A47J 31/043 99/292 |
| 2,621,581 | A | * 12/1952 | Varney | A47J 31/043 210/117 |
| 2,621,582 | A | * 12/1952 | Varney | A47J 31/043 210/117 |
| 2,664,811 | A | 1/1954 | Jepson | |
| 2,667,565 | A | * 1/1954 | Wallower | A47J 31/047 219/441 |
| 3,862,347 | A | 1/1975 | Thijssen | |
| 4,510,853 | A | 4/1985 | Takagi | |
| 4,721,034 | A | 1/1988 | Shimomura | |
| 4,742,767 | A | 5/1988 | Komatsu et al. | |
| 4,876,953 | A | 10/1989 | Imamura et al. | |
| 5,479,849 | A | * 1/1996 | King | A47J 31/40 99/287 |
| 7,886,655 | B1 | * 2/2011 | Lassota | A47J 31/06 99/306 |
| 2006/0249035 | A1 | 11/2006 | Lin | |
| 2009/0317526 | A1 | 12/2009 | Tacklind et al. | |
| 2010/0203209 | A1 | 8/2010 | Fishbein et al. | |
| 2012/0183659 | A1 | 7/2012 | Hulett et al. | |
| 2013/0136833 | A1 | * 5/2013 | Vastardis | A47J 31/44 426/416 |
| 2013/0213240 | A1 | * 8/2013 | O'Brien | A47J 31/38 99/297 |
| 2014/0208954 | A1 | * 7/2014 | Starr | A47J 31/462 99/283 |

FOREIGN PATENT DOCUMENTS

| | | |
|---|---|---|
| FR | 1535068 | 8/1968 |
| WO | 2009/086613 | 7/2009 |

OTHER PUBLICATIONS

International Search Report for International Application No. PCT/US2014/050808 mailed Mar. 2, 2015.

* cited by examiner

COFFEE BREWING DEVICE WITH MANUAL SIPHON AND METHOD OF BREWING WITH SAME

TECHNICAL FIELD

The present invention relates generally to a method of brewing coffee and the device in used that method and, more particularly, to an immersion brewing device with a jacketed brewing vessel and a manual siphon element for evacuating the brewing vessel.

BACKGROUND

Coffee brewing consists essentially of exposing ground, roasted coffee beans to water in order to extract water-soluble compounds from the beans. After extraction, the coffee-infused water is typically filtered to separate the spent beans from the water. Various ways to brew coffee have been developed, including pour-over methods, where water is gradually passed through a bed of ground coffee before passing through a filter and being collected into a holding vessel, and immersion methods, where the coffee and water are held together for the entire duration of the brewing process before separating the water from the spent grounds.

One example of an immersion brewing device is a siphon brewer (also referred to as a vacuum brewer). A siphon brewing device consists of an upper and a lower chamber with a siphon tube connecting the chambers. To use the siphon brewer, the lower chamber is filled with a volume of water and the upper chamber is filled with a volume of ground, roasted coffee beans. A filter prevents the ground coffee from entering the lower chamber. Heat is applied to the lower chamber, resulting in increased water vapor pressure in the lower chamber forcing the water through the siphon tube and into the upper chamber, where it comes into contact with the ground coffee. By continuing to apply heat to the lower chamber, the pressure in the lower chamber remains sufficient to keep the water in the upper chamber while the water is infused with the ground coffee. Once the desired brewing time has elapsed, the heat is removed from the lower chamber, thereby reducing pressure in the lower chamber and drawing the water, now infused with the ground coffee, back into the lower chamber to be served.

SUMMARY

Embodiments of the present invention include a device for brewing coffee or other infused beverages. The device has a base with a bowl, a first neck communicatively connected to the bowl, and a second neck communicatively connected to the bowl. Embodiments further include methods of using the device. The device further has a brewing vessel communicatively connected to the first neck and a siphon element communicatively connected to the second neck. The siphon element is adapted to reduce the pressure within the bowl, so that when the brewing vessel is filled with a volume of water, reducing the pressure within the bowl results in the volume of water flowing from the brewing vessel into the bowl.

The brewing vessel may include a brewing cup defined by a first volume surrounded by an inner wall, where the brewing cup is communicatively connected to the bowl by the first neck of the base, a jacket defined by a second volume surrounding the brewing cup between the inner wall and an outer wall, and a brewing bed including a semi-porous filter separating the brewing cup from the bowl. When the brewing cup is filled with a first volume of water, a second volume of water may be added to the jacket to change the temperature of the first volume of water.

The siphon element may include a siphon neck communicatively connected to the bowl by the second neck of the base, a divider in the siphon neck dividing the siphon neck into an upper region and a lower region, an outlet valve, a release valve, and a plunger. The outlet valve may include a first upper opening communicatively connected to the upper region of the siphon neck, and a first lower opening communicatively connected to the lower region of the siphon neck. The release valve may include a second upper opening communicatively connected to the upper region of the siphon neck, and a second lower opening communicatively connected to the upper region of the siphon neck. Air may pass from the upper region to the lower region only through the outlet valve. When the plunger is pulled in an upward direction, the outlet valve opens and causes air to flow from the bowl to the upper region of the siphon neck. When the plunger is pushed in a downward direction, the release valve opens and causes air to flow from the siphon neck, through the release valve, and out of the brewing device.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

Embodiments of the present invention include a device for brewing coffee that avoids the difficulty of controlling drop time in siphon brewing. In siphon brewing devices, the extracted coffee is removed by removing heat from the lower chamber until the reduced pressure draws the coffee from the upper chamber. The amount of time it takes for the coffee to move from the upper chamber to the lower chamber is typically referred to as the drop time. It is difficult to accurately predict and control the drop time of a siphon brewing device because the change in pressure in the lower chamber depends on a large number of factors, including at least the volume of the chamber, the volume of water, the amount of heat applied, and the insulation capability of the chamber. Because the extraction time can greatly affect the flavor profile of the extracted coffee, often in undesirable ways, siphon brewing may lead to inconsistent coffee quality due to unpredictable drop times. For example, a fast drop time of approximately 30 seconds may result in a crisp, clean-tasting coffee while a slow drop time of approximately 2 minutes may result in a coffee higher in total dissolved solids (TDS), which some drinkers may find unpleasant.

Rather than relying on a temperature change to draw the coffee from the upper chamber to the lower chamber, embodiments of the present invention utilize a manual siphon to create the necessary vacuum in a controllable manner. Although this description refers specifically to coffee throughout, it will be apparent that embodiments of the present invention are equally suited for brewing other beverages such as tea or herbal infusions where the brewing process includes steeping a solid in a liquid for a desired amount of time and then straining the liquid, preferably quickly, from the solid. Accordingly, any reference to "coffee" should be interpreted as including other beverages such as tea and herbal infusions, and "ground coffee" should be interpreted as referring to any particulate matter intended for infusion into water.

Figure 1A:
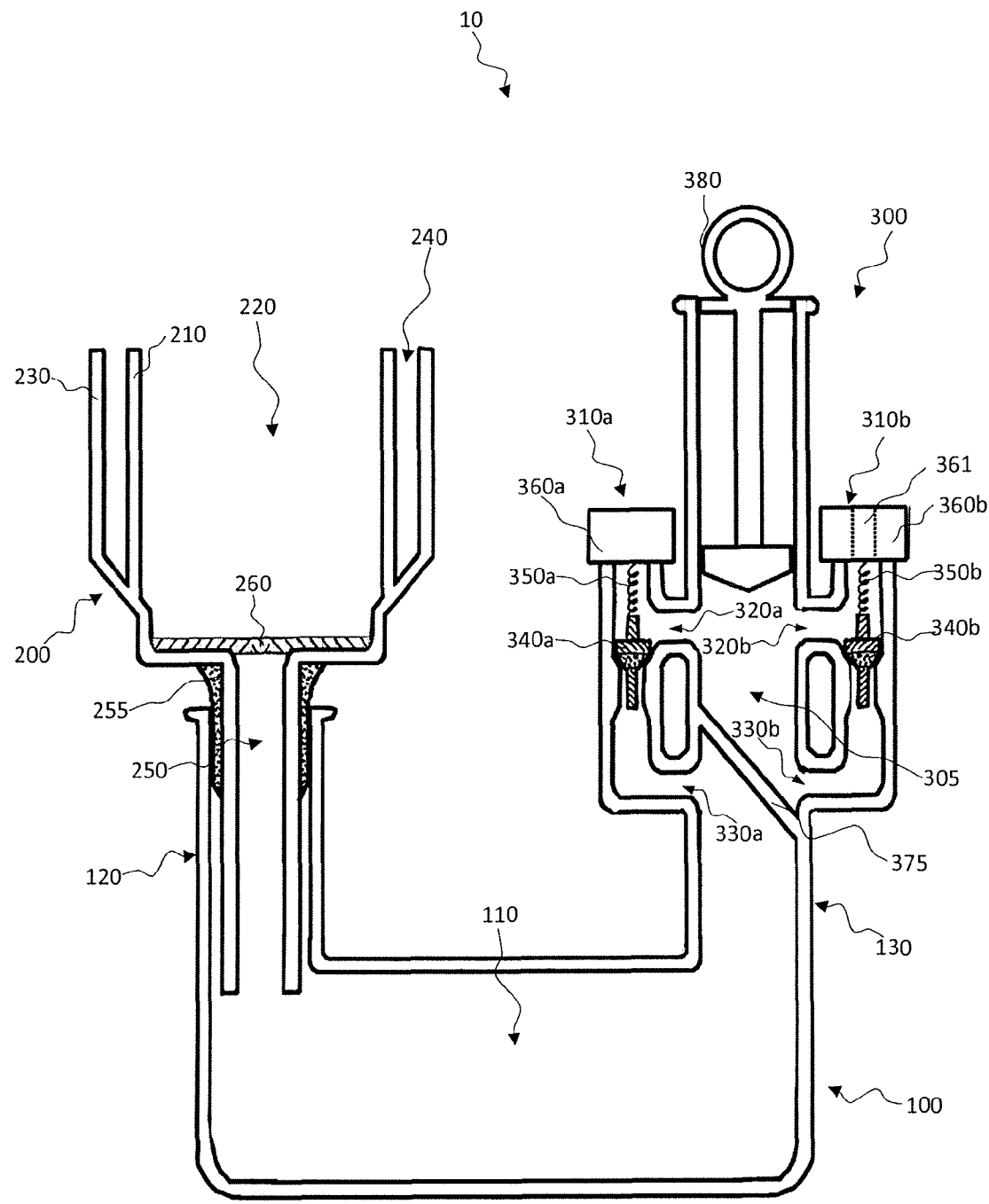
FIG. 1A is a cross-sectional view depicting a brewing device having a manual siphon and jacketed brewing vessel, according to an exemplary embodiment of the present invention.

Referring to FIG. 1A, a brewing device 10 is provided according to an exemplary embodiment of the present invention. The brewing device 10 includes a base 100, a brewing vessel 200, and a siphon element 300. Except where otherwise noted, the brewing device 10 may be made of any suitable material for brewing coffee, including, but not limited to, glass, plastic, or metal. Suitable materials are preferably resistant to the temperatures and pressures associated with the coffee brewing process described below (e.g., temperatures up to that of boiling water and pressures below atmospheric pressure) and are non-reactive with acidic solutions such as brewed coffee. In a preferred embodiment, the brewing device 10 is made primarily of borosilicate or soda-lime glass.

The base 100 of the brewing device includes a base bowl 110 communicatively connected to a first neck 120 and a second neck 130. As used in this specification "communicatively connected" is defined as allowing a fluid (e.g., water or air) to flow from a first element to a second element (e.g., from the first neck 120 to the base bowl 110). Unless otherwise noted, fluid may also flow in the reverse direction from the second element to the first element. The base bowl 110 has a volume sufficient to hold a desired volume of brewed coffee. For example, the volume of the base bowl 110 may range from approximately 1 cup to approximately 4 cups, though greater and lesser volumes are explicitly contemplated.

As depicted in FIG. 1A, the first neck 120 and the second neck 130 are preferably integral to the base bowl 110. By "integral" is meant a single piece or a single unitary part that is complete by itself without additional pieces, i.e., the part is of one monolithic piece formed as a unit with another part. In an alternative embodiment, however, either the first neck 120 or the second neck 130 (or both) may be detachable from the base bowl 110, for example to allow for easier cleaning of the base bowl 110. Openings of the first neck 120 and the second neck 130 are preferably round, though in other embodiments the openings of the first neck 120 and the second neck 130 may have other shapes such as square. The brewing vessel 200 is communicatively connected to the first neck 120 and the siphon element 300 is communicatively connected to the second neck 130. Either one or both of the brewing vessel 200 and the siphon element 300 may be detachable from the first neck 120 and the second neck 130, respectively. In a preferred embodiment, the brewing vessel 200 is detachable from the first neck 120 while the siphon element 200 is integral with the second neck 130.

The brewing vessel 200 has an inner wall 210 surrounding a volume defining a brewing cup 220, an outer wall 230 surrounding the brewing cup 220 defining a jacket 240, and a stem 250 communicatively connected to the brewing cup 220. The stem 250 is sized to fit within the first neck 120 of the base 100, so that the brewing vessel 200 forms an airtight seal with the base 100. The stem 250 may further include a gasket 255 to improve the seal between the brewing vessel 200 and the base 100. The gasket 255 may preferably be made of rubber. Alternatively, the gasket 255 may be made of the same glass as the base 100 and a thin layer of food-safe grease may be applied to the gasket 255 to improve the seal. In an embodiment where the brewing vessel 200 is integral with the base 100, the stem 250 and the gasket 255 may be absent.

Figure 1B:
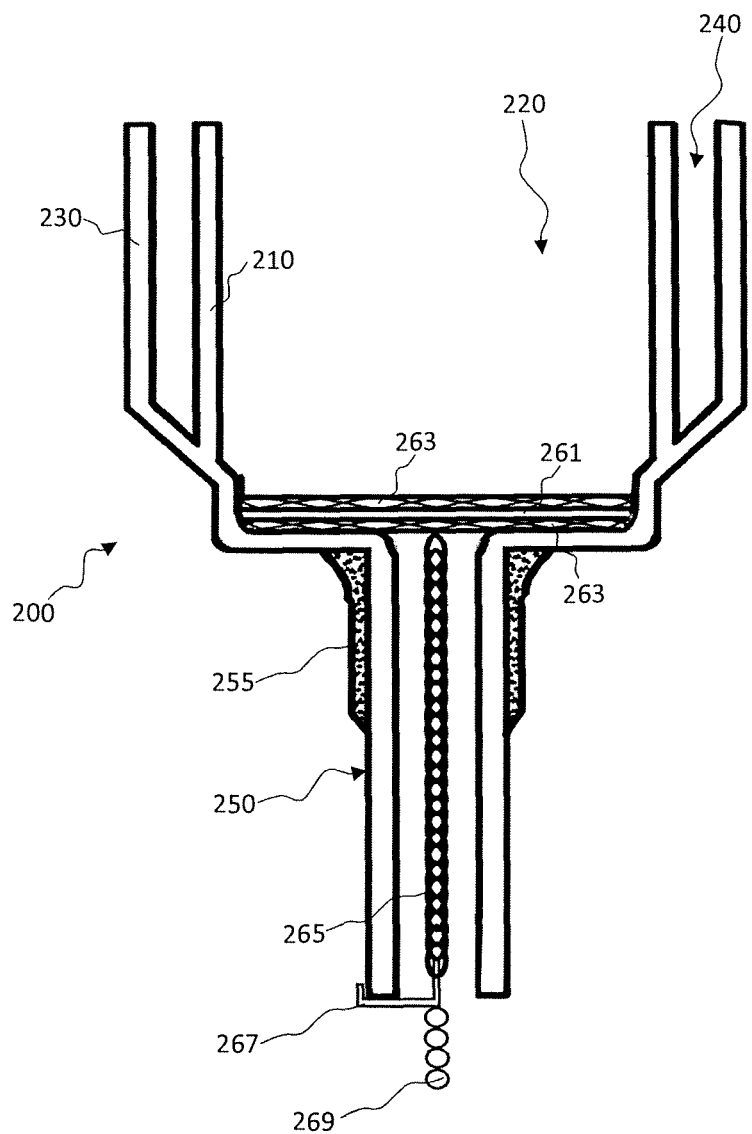
FIG. 1B is a cross-sectional view of a filter holder disposed in the jacketed brewing vessel of FIG. 1A, according to an exemplary embodiment of the present invention.

The brewing cup 220 preferably has a volume less than the volume of the base bowl 110. As explained in greater detail below, the inner wall 210 and the outer wall 230 are preferably sized so that heat may be transferred between a volume of water contained in the brewing cup 220 and a volume of water in the jacket 240 to control the temperature of the water in the brewing cup 220. The brewing vessel 200 may also include a brewing bed 260, including a filter. The brewing bed 260 is disposed with the bottom of the brewing cup 220 to prevent a substantial amount of ground coffee from entering the base bowl 110 and to control the flow of water from the brewing cup 220 to the base bowl 110. In an exemplary embodiment depicted in FIG. 1B, the brewing bed 260 (FIG. 1A) may include a paper filter 261 between two metal filter holders 263. Other suitable filters may be made of glass or metal, for example a gold mesh filter. The metal filter holders 263 may be made of any suitable non-reactive metal such as stainless steel perforated with sufficiently large holes to not substantially restrict the flow of water through the metal filter holders 263. In other embodiment, the metal filter holders 263 may be metal screens. The brewing bed 260 may be held in place by an elastic chain or spring 265 anchored to the bottom of the stem 250 by a hook 267. The brewing bed may be disposed by feeding the chain 265 through the stem 250, pulling on the hook 267 to stretch the spring 265 and placing the hook 267 over the opening of the stem 250. The brewing bed 260 may also include a second chain 269 to assist in stretch the spring 265.

The siphon element 300 may be any suitable combination of elements capable of creating a partial vacuum within the base bowl 110 by a mechanism other than creating a temperature change in the base bowl 110. As used in the specification, "siphon" refers to the ability of the siphon element 300 to draw water from the brewing cup 220 into the base bowl 110 by creating the partial vacuum similar to the effect of the previously described siphon brewing device and does not limit the height of the water in the brewing cup 220 or the base bowl 110 to any particular configuration. In a preferred embodiment, the siphon element 300 includes a siphon neck 305 adjacent to the second neck 130 of the base 100, and an outlet valve 310a and a release valve 310b on opposite sides of the siphon neck 305. While the outlet valve 310a and the release valve 310b are depicted in the same plane as the brewing vessel 200, this orientation is for illustrative purposes only and the outlet valve 310a and the release valve 310b may preferably be disposed on a plane perpendicular to the plane of FIG. 1A to reduce the necessary distance between the brewing vessel 200 and the siphon element 300.

The outlet valve 310a and the release valve 310b include upper openings 320a, 320b, lower openings 330a, 330b, and seat valves 340a, 340b disposed between the upper openings 320a, 320b and the lower openings 330a, 330b, respectively. The seat valves 340a, 340b are held in place by springs 350a, 350b that apply downward forces to the seat valves 340a, 340b to create seals between the upper openings 320a, 320b and the lower openings 330a, 330b. The outlet valve 310a and the release valve 310b are sealed by caps 360a, 360b, respectively. Caps 360a, 360b may be integral with the outlet valve 310a and the release valve 310b, respectively, or may be detachable. For example, the caps 360a, 360b may be screw-on plastic caps. The siphon element 300 further includes a plunger 380 and a divider 375 separating the siphon neck 305 into two regions, (1) a lower region communicatively connected to the lower opening 330a of the outlet valve 310a and (2) an upper region communicatively connected to the upper opening 320a of the outlet valve 310a and the upper opening 320b and the lower opening 330b of the release valve 310b. The plunger 380 may be preferably operated manually, or alternatively operated by a motor.

Figure 2:
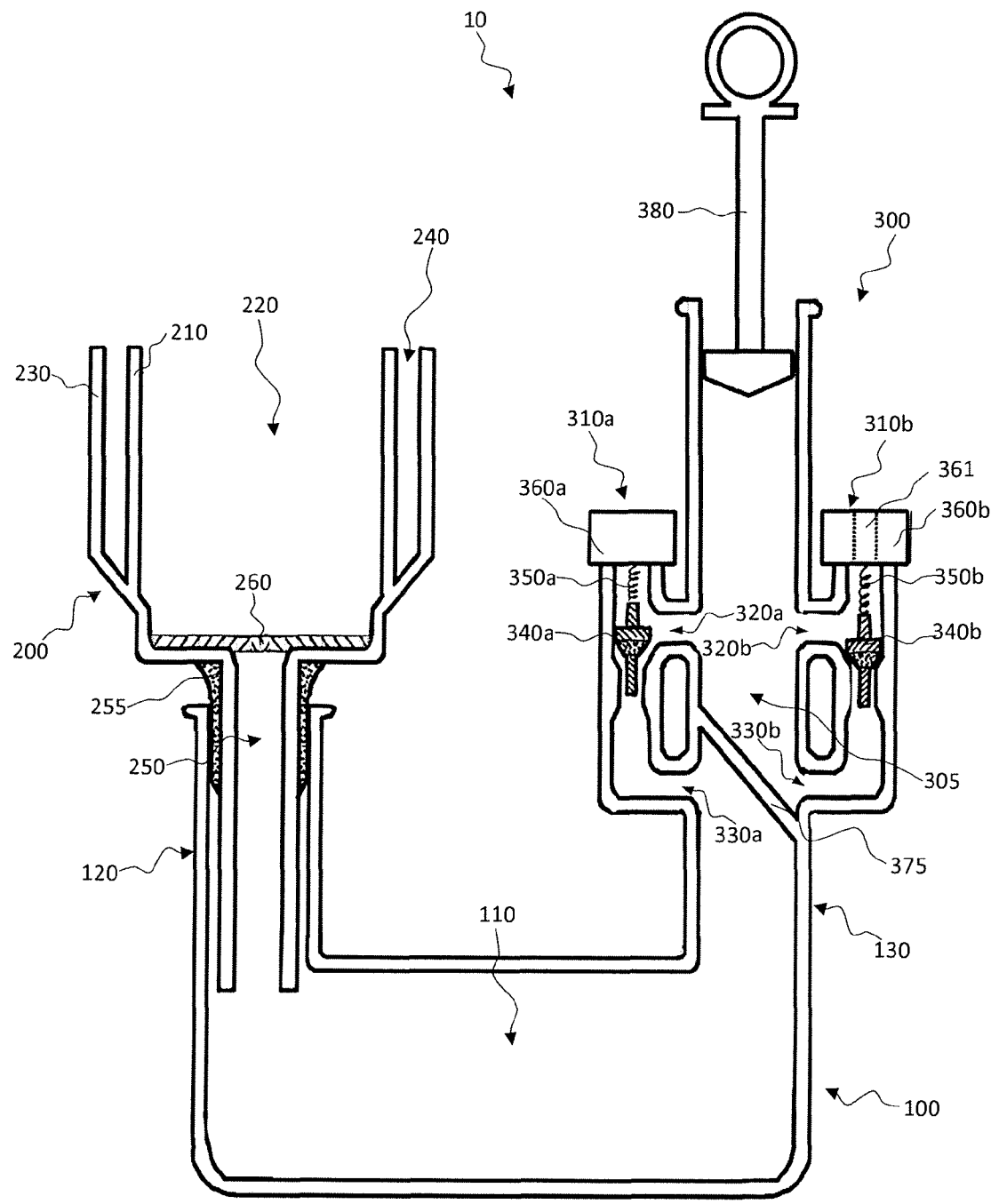
FIG. 2 is a cross-sectional view which shows operating the manual siphon to reduce pressure in the base bowl of the brewing device, according to an exemplary embodiment of the present invention.

Referring to FIG. 2, when the plunger 380 is pulled upward, the pressure in the upper region of the siphon neck 305 decreases due to the increase in volume. Because of the position of the divider 375, the pressure in the base bowl 110 is initially unaffected by the movement of the plunger 380. Once the upward force caused by the pressure differential between the base bowl 110 and the siphon neck 305 becomes greater than the downward force applied to the seat valve 340a by the spring 350a, the seat valve 340a moves upward to open the outlet valve 310a and allow air to move from the base bowl 110 into the siphon neck 305, as depicted in FIG. 2. Meanwhile, the release valve 310b remains closed to prevent air from entering the siphon neck 305 through the release valve 310b. Accordingly, the pressure in the base bowl 110 is reduced to a pressure less than its initial pressure. After the pressures in the base bowl 110 and the siphon neck 305 equalize, the seat valve 340a will be pushed back down into its initial position by the spring 350a to close the outlet valve 310a.

Figure 3:
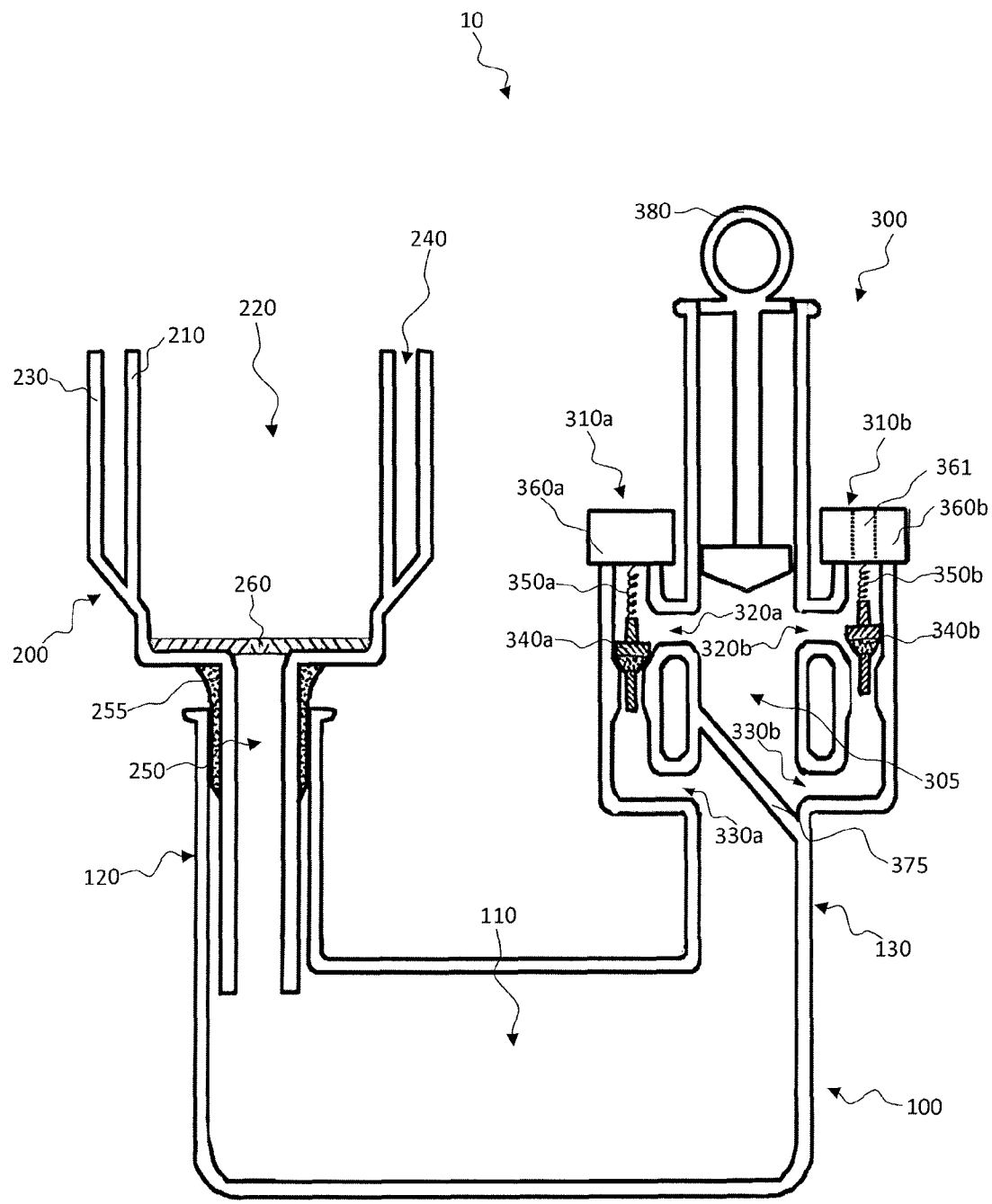
FIG. 3 is a cross-sectional view which shows returning the manual siphon to its initial position, according to an exemplary embodiment of the present invention.

Referring to FIG. 2, when the plunger 380 is pushed downward into its initial position, the pressure in the siphon neck 305 increases due to the decrease in volume. Because the pressure in the siphon neck 305 is greater than in the base bowl 110, the outlet valve 310a remains closed to prevent air from reentering the base bowl 110. To relieve the excess pressure, the seat valve 340b of the release valve 310b will move upward due to the increased pressure and open the release valve 310b. When the release valve 310b is opened, air may escape out a hole 361 in the cap 360b. After the pressure in the siphon neck 305 is reduced, the seat valve 340b will be pushed back down into its initial position by the spring 350b to close the release valve 310b and return the siphon element 300 to its initial position. FIG. 3 is a cross-sectional view which shows returning the siphon element 300 to its initial position. Accordingly, each cycle of moving the plunger 380 upward and then downward results in a decrease in pressure in the base bowl 110 without substantially changing the pressure in the siphon neck 305. The cycle therefore may be repeated any number of times to achieve the desired pressure in the base bowl 110.

As described below in conjunction with FIGS. 4-9, further embodiments of the present invention include methods of using the brewing device 10 to brew coffee by infusing water with ground coffee and then filtering to remove the infused water from the spent ground coffee. As previously mentioned, it will be apparent that the embodiments of the present invention are equally suited for brewing other beverages such as tea or herbal infusions.

Figure 4:
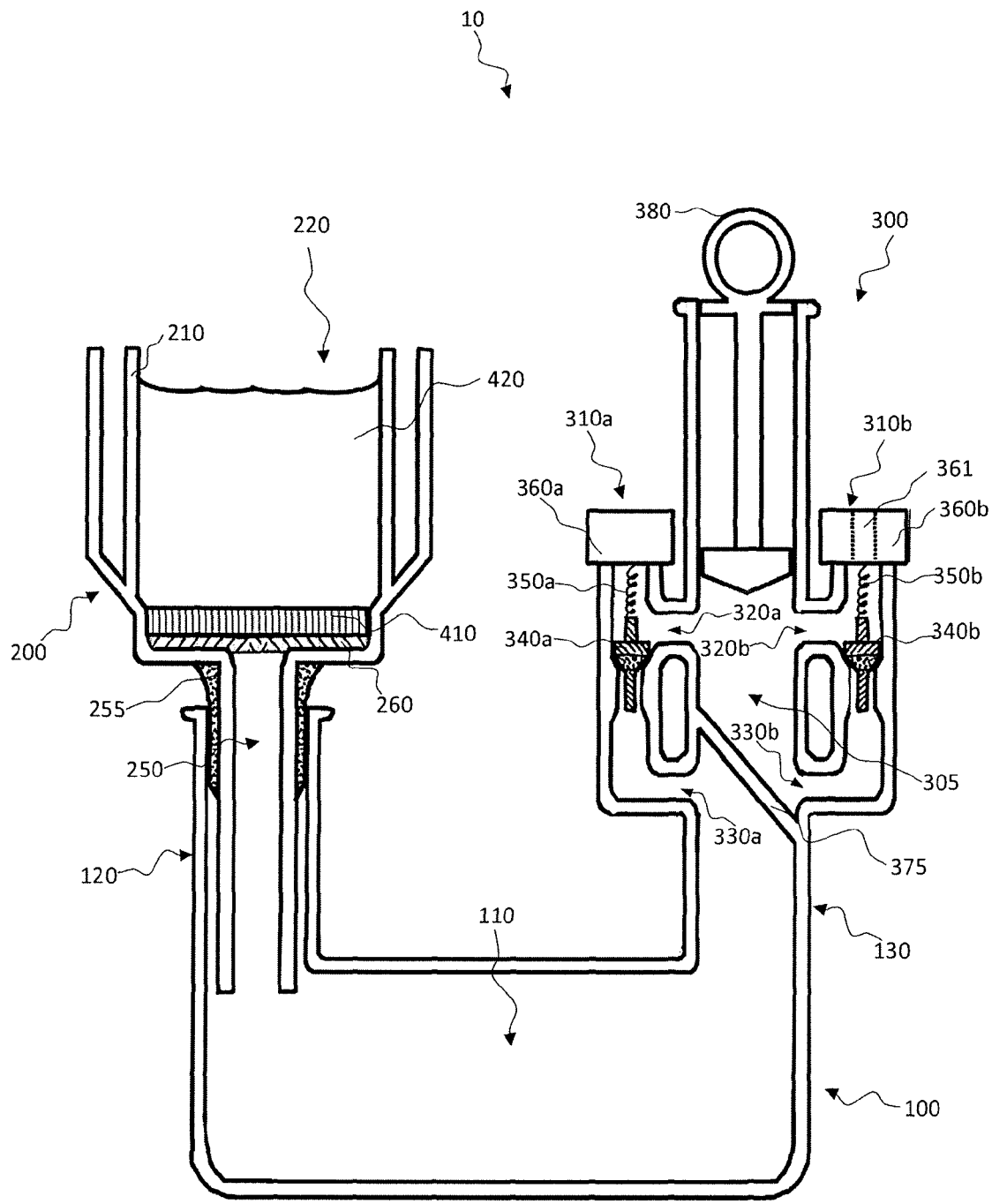
FIG. 4 is a cross-sectional view which shows filling the brewing cup of the brewing device with ground coffee and water, according to an exemplary embodiment of the present invention.

Referring to FIG. 4, the brewing cup 220 is first filled with a volume of ground coffee 410 followed by a volume of water 420. The brewing bed 260 has a filter adapted to prevent any of the ground coffee 410 or the water 420 from passing through the brewing bed 260 while the base bowl 110 is at a first pressure, typically atmospheric pressure. The volume of the ground coffee 410, the volume of water 420, and the initial temperature of the water 420 may be adapted to change the characteristics of the resulting brewed coffee, as is commonly known in the art. For example, the ratio of the ground coffee 410 to the water 420 may be approximately 1:16 on a mass: mass basis and the initial temperature of the water may be approximately 210 degrees Fahrenheit (° F.). The mixture of ground coffee 410 and the water 420 may be referred to as the slurry. After the water 420 is added, the slurry is allowed to sit for a desired amount of time to permit the water to be infused with the ground coffee 410, referred to as the brew time. Exemplary brew times may range from approximately two to approximately four minutes. The slurry may optionally be mixed intermittently or constantly throughout the brew time.

Figure 5:
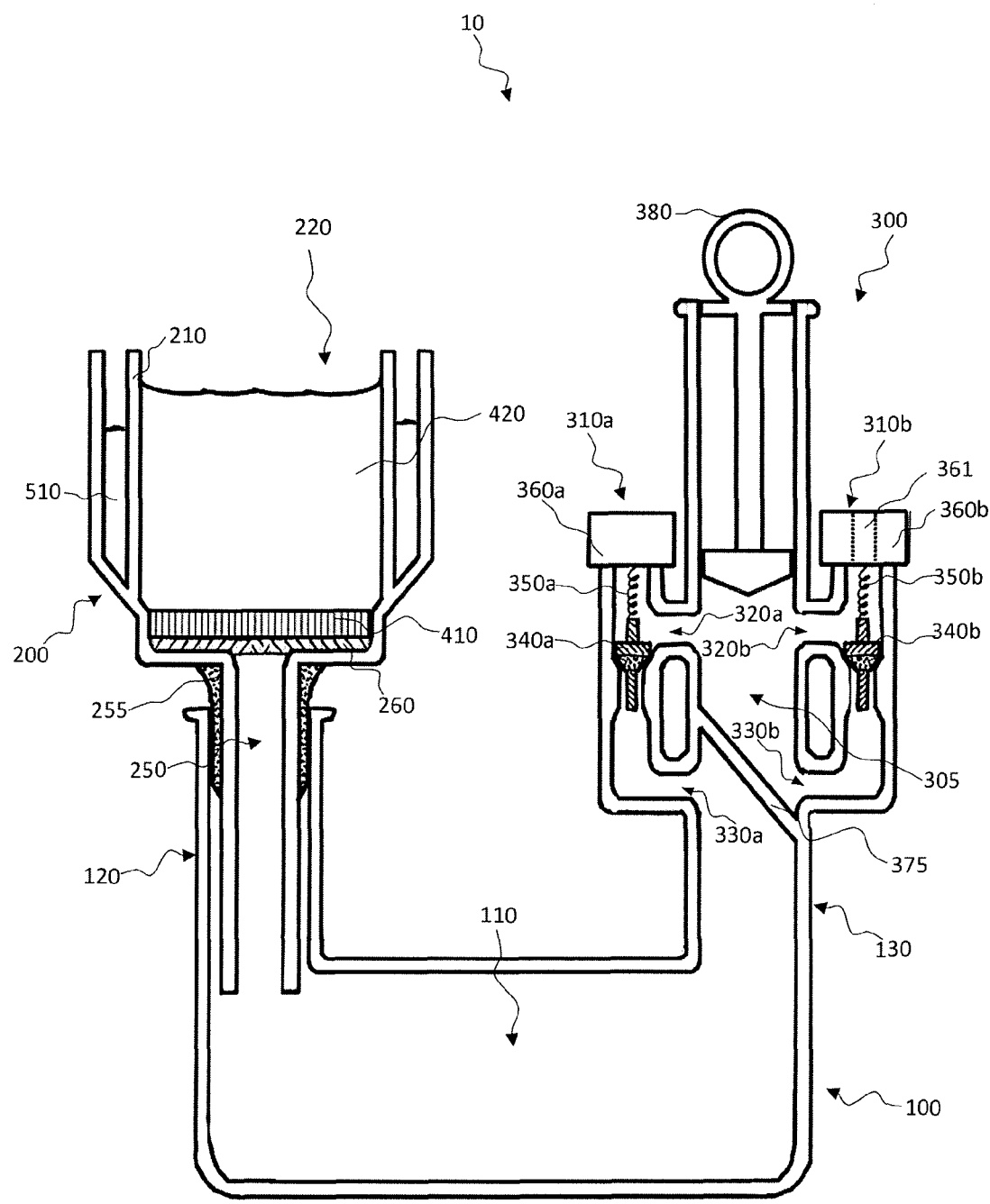
FIG. 5 is a cross-sectional view which shows adding water to the jacket of the brewing device of FIG. 1A, according to an exemplary embodiment of the present invention.

Referring to FIG. 5, a second volume of water 510 may optionally be added to the jacket 240 to change the temperature of the slurry including the ground coffee 410 and the water 420 during the brew time. Because, the second volume of water 510 does not come into contact with the slurry, it may instead include a different fluid with improved heat capacity, such as oil. It is commonly understood by coffee brewers that the temperature of the slurry over the course of the brewing time has a profound impact on the resulting flavor of the brewed coffee, as different soluble flavor compounds in ground coffee may infuse into water at different times and temperatures. Typical coffee brewing methods only attempt to control this profile through the initial water temperature, the rate at which water is poured over ground coffee, the brew time, and the insulating ability of various brewing vessels. The brewing device 10 offers greater control over the slurry temperature. By adding the second volume of water 510 (of greater or lesser temperature than the temperature of the slurry and/or of greater or lesser mass per unit volume than the mass per unit volume of the slurry) to the jacket 240, the temperature profile of the brewing process may be altered to preferentially extract the desired flavor compounds.

Figure 6:
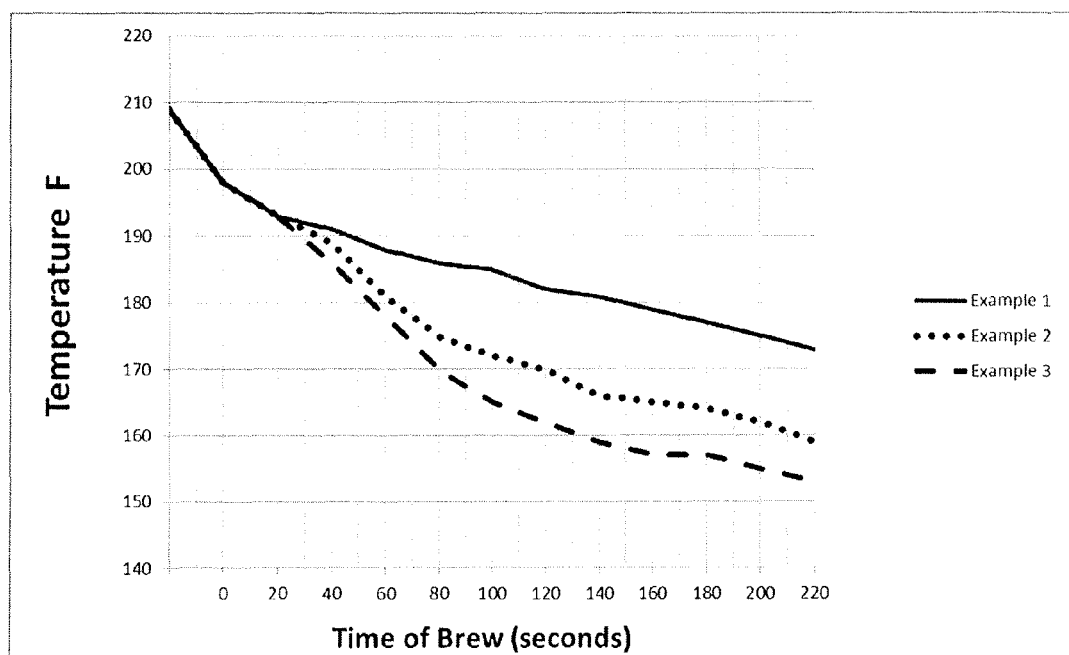
FIG. 6 is graph depicting the effect of adding water of various temperatures to the jacket of the brewing vessel during the brewing process, according to an exemplary embodiment of the present invention.

For example, some coffees possess acidic flavors, cherished by some coffee drinkers, that are extracted at high temperatures early in the brewing process, but possess equally desirable sweet flavors that are extracted at low temperatures later in the brewing process. Adding only the brewing water alone at high temperatures, the brewing process will not reach the desired lower temperatures before the coffee is over-extracted. Table 1 depicts exemplary processes by which use of the jacket 240 of the brewing device 10 solves this problem. FIG. 6 is a graph depicting the data included in Table 1. In Example 1, no water is added to the jacket 240 during the brewing process. In Example 2, 50 mL of 79° F. water is added after 40 seconds. In Example 3, 50 mL of 48° F. water is added after 40 seconds. As can be seen from the data, the slurry temperature in the brewing cup 220 drops more rapidly after filling the jacket 240 with water, with the rate of change dependent on the volume of water. It will be understood from these examples that the rate of temperature decrease in the slurry may also be slowed or even reversed by adding warmer water to the jacket 240. Further, it will be understood that even finer control over the temperature profile may be established by adding the water in more than one stage at the same or different temperatures.

TABLE 1

| Time (s) | Example 1 | Example 2 | Example 3 |
|---|---|---|---|
| | | Slurry Temperature (° F.) | |
| 0 | 209 | 209 | 209 |
| 20 | 198 | 198 | 198 |
| 40 | 193 | 193 | 193 |
| 60 | 191 | 189 | 186 |
| 80 | 188 | 181 | 178 |
| 100 | 186 | 175 | 170 |
| 120 | 185 | 172 | 165 |
| 140 | 182 | 170 | 162 |
| 160 | 181 | 166 | 159 |
| 180 | 179 | 165 | 157 |
| 200 | 177 | 164 | 157 |
| 220 | 175 | 162 | 155 |
| 240 | 173 | 159 | 153 |

The examples are included to more clearly demonstrate the overall nature of the invention. These examples are exemplary, not restrictive, of the invention.

Figure 7:
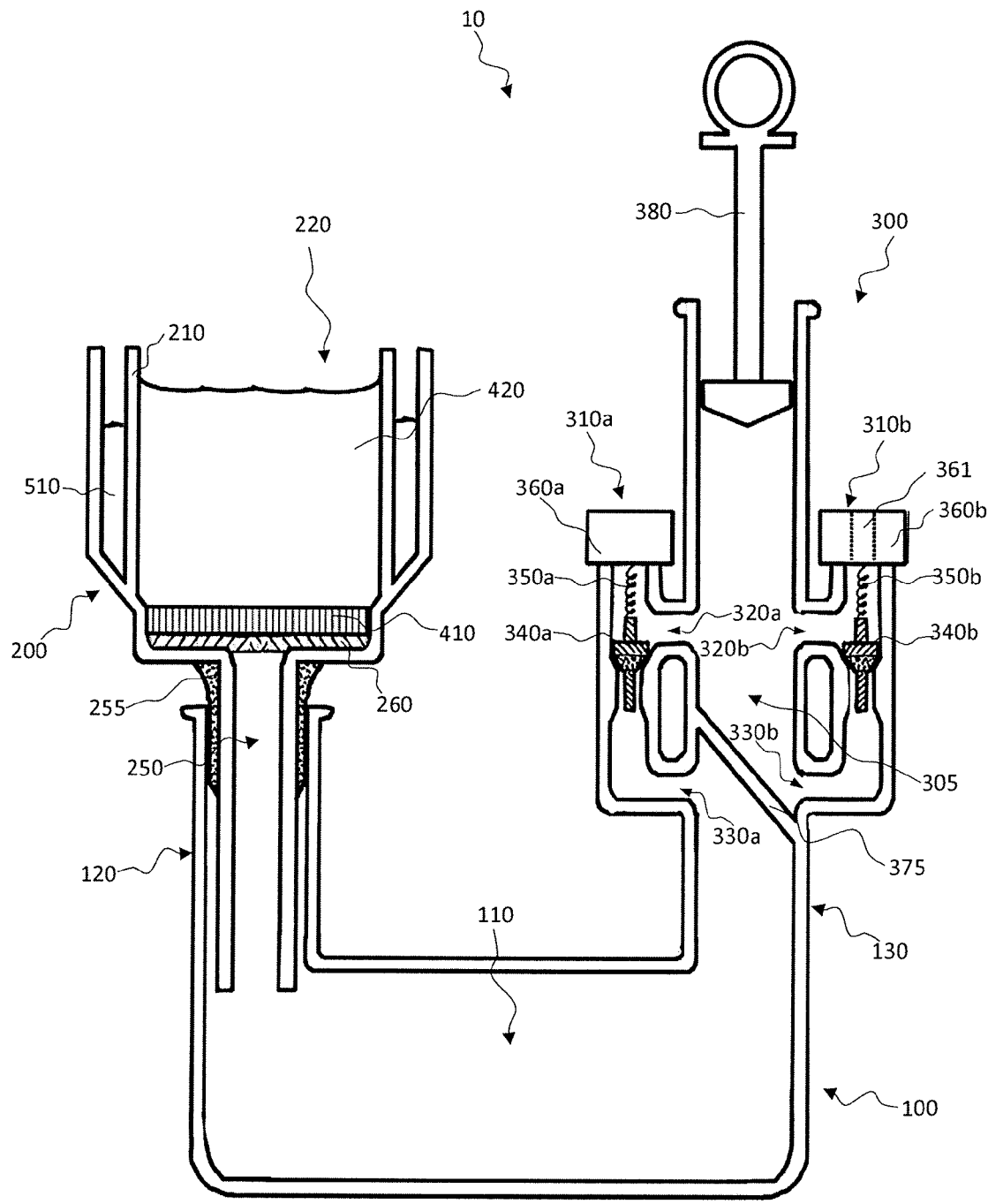
FIG. 7 is a cross-sectional view which shows operating the manual siphon to reduce pressure in the base bowl of the brewing device, according to an exemplary embodiment of the present invention.

Referring to FIG. 7, after the desired brew time has elapsed, the plunger 380 may be pulled upward to begin reducing the pressure in the base bowl 110. As described above, pulling upward on the plunger 380 decreases pressure in the siphon neck 305 and opens the outlet valve 310*a*, causing air to move from the base bowl 110 into the siphon neck 305 to equalize the pressure. The plunger 380 may be moved upward and downward through any number of cycles until the desired pressure in the base bowl 110 is achieved.

Figure 8:
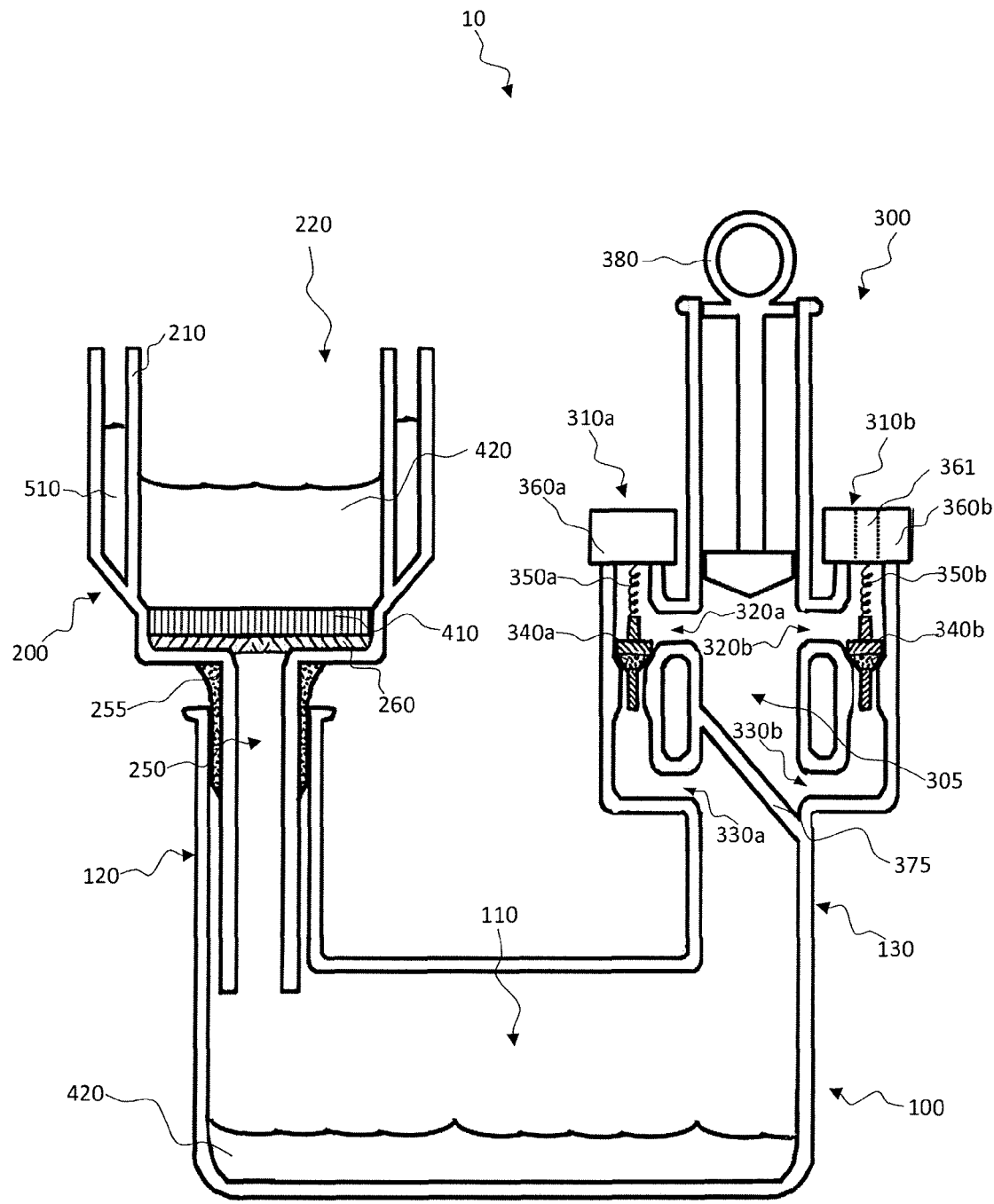
FIG. 8 is a cross-sectional view depicting infused water flowing from the brewing cup into the base bowl, according to an exemplary embodiment of the present invention.

Referring to FIG. 8, once a sufficiently low pressure in the base bowl 110 is achieved, the infused water 420 will begin to flow from the brewing cup 220, through the brewing bed 260, and into the base bowl 110. The rate at which the infused water 420 flows is dependent on the differential between the pressure in the base bowl 110 and the atmospheric pressure outside the brewing device 10. Therefore, the drop time, as described above, may be controlled by the number of cycles the siphon element 300 undergoes. A greater number of cycles will increase the pressure differential and therefore decrease the drop time, and a lesser number of cycles will decrease the pressure differential and therefore increase the drop time.

Figure 9:
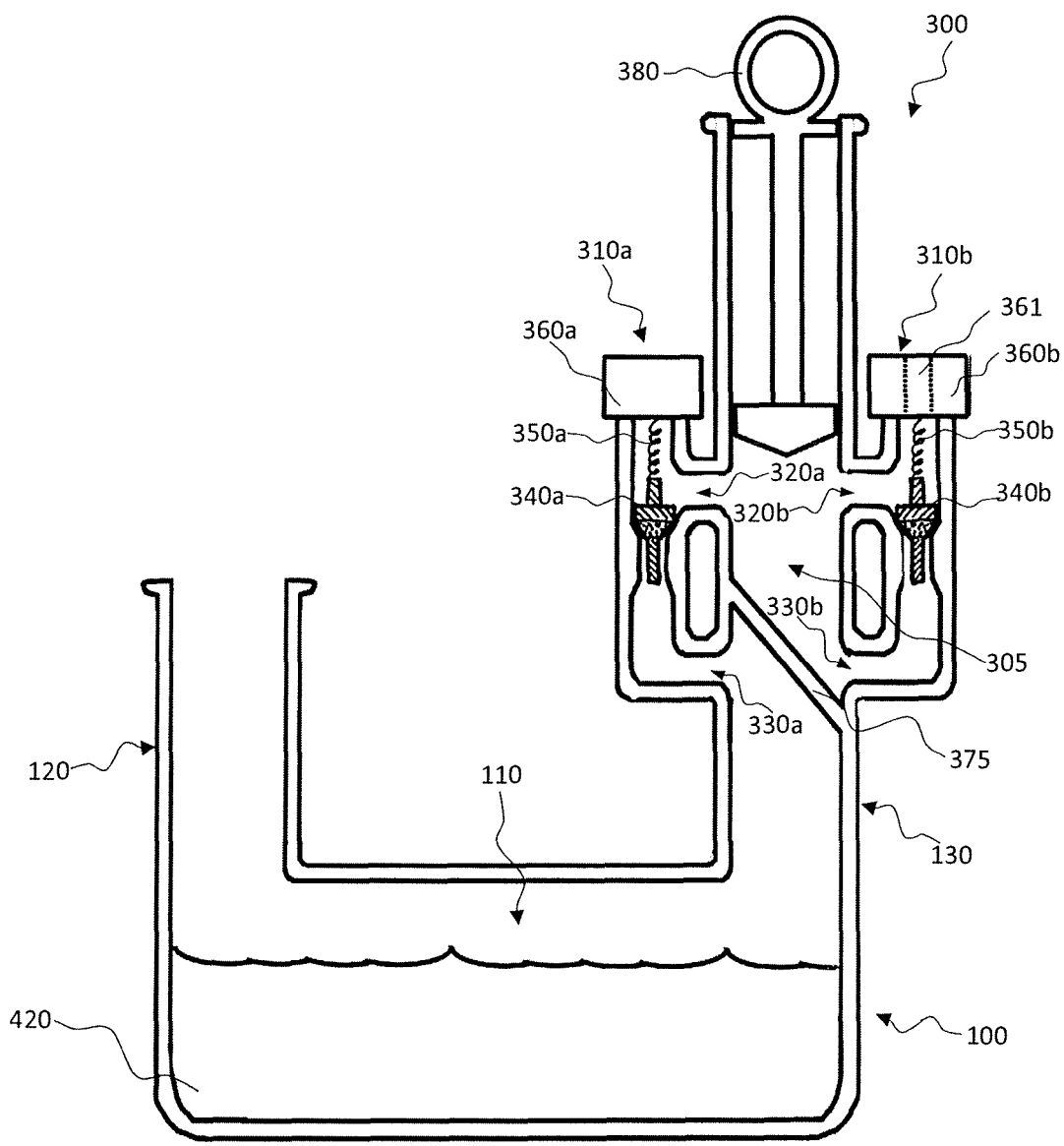
FIG. 9 is a cross-sectional view which shows removing the brewing vessel from the base, according to an exemplary embodiment of the present invention.

Referring to FIG. 9, after the drop time has elapsed and all of the infused water 420 has flowed into the base bowl 110, the infused water 420 may be served from the base bowl 110. In the embodiment pictured in FIG. 9, the infused water 420 may be served by removing the brewing vessel 200 (FIG. 8) and pouring the infused water 420 from the first neck 120. In other embodiments, the siphon element 300 may instead be detached (not shown) and the infused water 420 poured from the second neck 130. In another embodiment, the base 100 may include a third neck or outlet (not shown) from which the infused water 420 may be poured so that neither the brewing vessel 200 nor the siphon element 300 needs to be removed.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges. It is also expressly intended that the steps of the methods of using the various devices disclosed above are not restricted to any particular order.

I claim:

1. A brewing device comprising:
   a base having a bowl, a first neck communicatively connected to the bowl, and a second neck communicatively connected to the bowl;
   a brewing vessel communicatively connected to the first neck; and
   a siphon element communicatively connected to the second neck, the siphon element including:
      a siphon neck communicatively connected to the bowl by the second neck of the base;
      a divider in the siphon neck dividing the siphon neck into an upper region and a lower region;
      an outlet valve having a first upper opening communicatively connected to the upper region of the siphon neck and a first lower opening communicatively connected to the lower region of the siphon neck, wherein air may pass from the upper region to the lower region only through the outlet valve;
      a release valve having a second upper opening communicatively connected to the upper region of the siphon neck and a second lower opening communicatively connected to the upper region of the siphon neck; and
      a plunger in the upper region of the siphon neck, wherein pulling the plunger in an upward direction causes the outlet valve to open, resulting in air flowing from the bowl to the upper region of the siphon neck, and wherein pressing the plunger in a downward direction causes the release valve to open, resulting in air flowing from the siphon neck, through the release valve, and out of the brewing device,
   wherein the siphon element is adapted to reduce the pressure within the bowl, wherein when the brewing vessel is filled with a volume of water, reducing the pressure within the bowl results in the volume of water flowing from the brewing vessel into the bowl.

2. The brewing device of claim 1, wherein:
   the outlet valve further has a first seat valve between the first lower opening and the first upper opening, and a first spring applying a first downward pressure to the first seat valve; and
   the release valve further has a second seat valve between the lower opening and the upper opening, and a second spring applying a first downward pressure to the first seat valve.

3. The brewing device of claim 1, wherein the first upper opening is level with the second upper opening, the first lower opening is level with the second lower opening, and the divider is angled within the siphon neck.

4. The brewing device of claim 1, wherein one or both of the brewing vessel or the siphon element is detachable from the base.

5. The brewing device of claim 3, wherein the brewing vessel is detachable from the base and further comprises a stem communicatively connected to the brewing cup and a gasket surrounding the stem adapted to create an airtight seal between the brewing vessel and the base.

6. The brewing device of claim 1, wherein the brewing device comprises primarily borosilicate glass or soda-lime glass.

7. A method of brewing a beverage including water infused with a solid particulate, the method comprising:
    providing a brewing device having:
        a base including a bowl, a first neck communicatively connected to the bowl, and a second neck communicatively connected to the bowl,
        a brewing vessel communicatively connected to the first neck, and
        a siphon element communicatively connected to the second neck, the siphon element including:
        a siphon neck communicatively connected to the bowl by the second neck of the base;
        a divider in the siphon neck dividing the siphon neck into an upper region and a lower region;
        an outlet valve having a first upper opening communicatively connected to the upper region of the siphon neck and a first lower opening communicatively connected to the lower region of the siphon neck, wherein air may pass from the upper region to the lower region only through the outlet valve;
        a release valve having a second upper opening communicatively connected to the upper region of the siphon neck and a second lower opening communicatively connected to the upper region of the siphon neck; and
        a plunger in the upper region of the siphon neck, wherein pulling the plunger in an upward direction causes the outlet valve to open, resulting in air flowing from the bowl to the upper region of the siphon neck, and wherein pressing the plunger in a downward direction causes the release valve to open, resulting in air flowing from the siphon neck, through the release valve, and out of the brewing device;
    adding a first volume of the solid particulate to the brewing vessel;
    adding a first volume of water to the brewing vessel;
    infusing the water with the solid particulate for a desired amount of time; and
    operating the siphon element to reduce the pressure in the bowl, whereby the reduced pressure causes the infused water to flow from the brewing vessel to the bowl.

8. The method of claim 7, wherein the solid particulate comprises ground coffee.

9. The method of claim 7, wherein the brewing vessel comprises:
    a brewing cup defined by a first volume surrounded by an inner wall, wherein the brewing cup is communicatively connected to the bowl by the first neck of the base;
    a jacket defined by a second volume between the inner wall and an outer wall; and
    a brewing bed including a semi-porous filter separating the brewing cup from the bowl,
    wherein the first volume of the solid particulate and the first volume of water are added to the brewing cup of the brewing vessel.

10. The method of claim 7, further comprising adding a second volume of water to the jacket partway through the desired amount of time for infusing the water with the solid particulate, whereby adding the second volume of water to the jacket changes the temperature of the first volume of water in the brewing cup.

11. The method of claim 7, further comprising detaching the brewing vessel from the base and pouring the infused water from the first neck of the base.

12. The method of claim 7, wherein:
    the outlet valve further comprises a first seat valve between the first lower opening and the first upper opening, and a first spring applying a first downward pressure to the first seat valve; and
    the release valve further comprises a second seat valve between the lower opening and the upper opening, and a second spring applying a first downward pressure to the first seat valve.

13. The method of claim 7, wherein the first upper opening is level with the second upper opening, the first lower opening is level with the second lower opening, and the divider is angled within the siphon neck.

14. The method of claim 7, wherein the brewing device comprises primarily borosilicate glass or soda-lime glass.

15. A brewing device comprising:
    a base having a bowl, a first neck communicatively connected to the bowl, and a second neck communicatively connected to the bowl;
    a brewing vessel communicatively connected to the first neck, the brewing vessel comprising:
        a brewing cup defined by a first volume surrounded by an inner wall and including a stem extending from the first volume into the first neck, wherein the brewing cup is communicatively connected to the bowl by the first neck of the base;
        a jacket defined by a second volume surrounding the brewing cup between the inner wall and an outer wall; and
        a brewing bed including a semi-porous filter between two metal filter holders separating the brewing cup from the bowl, wherein the brewing bed is held in place at the bottom of the brewing cup by a hook attached to the bottom of the stem; and
    a siphon element communicatively connected to the second neck, wherein the siphon element is adapted to reduce the pressure within the bowl,
    wherein when the brewing vessel is filled with a volume of water, reducing the pressure within the bowl results in the volume of water flowing from the brewing vessel into the bowl.

16. The brewing device of claim 15, wherein the semi-porous filter comprises paper.

17. The brewing device of claim 15, wherein the jacket is adapted to transfer heat between a first volume of water in the brewing cup and a second volume of water in the jacket.

18. The brewing device of claim 15, wherein one or both of the brewing vessel or the siphon element is detachable from the base.

19. The brewing device of claim 15, wherein the siphon element includes:
    a siphon neck communicatively connected to the bowl by the second neck of the base;
    a divider in the siphon neck dividing the siphon neck into an upper region and a lower region;
    an outlet valve having a first upper opening communicatively connected to the upper region of the siphon neck and a first lower opening communicatively connected to the lower region of the siphon neck, wherein air may pass from the upper region to the lower region only through the outlet valve;

a release valve having a second upper opening communicatively connected to the upper region of the siphon neck and a second lower opening communicatively connected to the upper region of the siphon neck; and a plunger in the upper region of the siphon neck, wherein pulling the plunger in an upward direction causes the outlet valve to open, resulting in air flowing from the bowl to the upper region of the siphon neck, and wherein pressing the plunger in a downward direction causes the release valve to open.

20. The brewing device of claim 15, wherein the brewing device comprises primarily borosilicate glass or soda-lime glass.

\* \* \* \* \*